US008860588B1

(12) United States Patent
McDermed et al.

(10) Patent No.: US 8,860,588 B1
(45) Date of Patent: *Oct. 14, 2014

(54) TRAVEL TOY THAT ILLUSTRATES TIME ON A TRIP

(75) Inventors: Julie K. McDermed, Frankfort, IL (US); Stephen A. Zemcik, Owosso, MI (US); Paul M. McDermed, Frankfort, IL (US)

(73) Assignee: MCD International, Inc., Frankfort, IL (US)

( * ) Notice: Subject to any disclaimer, the term of this patent is extended or adjusted under 35 U.S.C. 154(b) by 183 days.

This patent is subject to a terminal disclaimer.

(21) Appl. No.: 13/416,094

(22) Filed: Mar. 9, 2012

Related U.S. Application Data

(63) Continuation of application No. 12/206,348, filed on Sep. 8, 2008, now Pat. No. 8,160,813.

(60) Provisional application No. 60/970,919, filed on Sep. 7, 2007.

(51) Int. Cl.
*G08G 1/123* (2006.01)

(52) U.S. Cl.
USPC ............ 340/995.27; 340/988; 340/995.1; 340/995.14; 701/408; 701/465

(58) Field of Classification Search
USPC ............ 340/990, 995.22, 995.27, 995.1, 340/995.11, 995.14, 995.16, 988; 701/431, 701/533, 468, 426, 408, 465, 441, 202, 204, 701/207; 704/276
See application file for complete search history.

(56) References Cited

U.S. PATENT DOCUMENTS

| | | | | |
|---|---|---|---|---|
| 5,999,892 A | * | 12/1999 | Fan | 702/158 |
| 6,317,687 B1 | * | 11/2001 | Morimoto et al. | 701/441 |
| 6,321,158 B1 | * | 11/2001 | DeLorme et al. | 701/426 |
| 6,687,614 B2 | * | 2/2004 | Ihara et al. | 701/428 |
| 7,474,960 B1 | * | 1/2009 | Nesbitt | 701/533 |
| 8,160,813 B1 | * | 4/2012 | McDermed et al. | 701/408 |
| 2004/0243307 A1 | * | 12/2004 | Geelen | 701/213 |
| 2006/0173615 A1 | * | 8/2006 | Pinkus et al. | 701/211 |

* cited by examiner

*Primary Examiner* — Anh V La
(74) *Attorney, Agent, or Firm* — Neal, Gerber & Eisenberg LLP

(57) ABSTRACT

The present invention provides devices and methods for illustrating travel time. The device includes a display screen, a starting point indicator, a destination indicator, a travel path, and a progress indicator. The starting point indicator represents a starting point and is adapted for display on the display screen. The destination indicator represents a destination point and is adapted for display on the display screen. The travel path represents a path of travel between the starting point and the destination point. The progress indicator is adapted to indicate a point between the starting point indicator and the destination indicator and is adapted for movement along the travel path. A method for illustrating travel time comprises displaying a starting point indicator on a display screen, displaying a destination indicator on the display screen, and displaying a progress indicator.

20 Claims, 6 Drawing Sheets

TRAVEL TOY THAT ILLUSTRATES TIME ON A TRIP

CROSS-REFERENCE TO RELATED APPLICATIONS

This application is a continuation of U.S. application Ser. No. 12/206,348, filed Sep. 8, 2008, and claims priority of U.S. provisional application Ser. No. 60/970,919 filed Sep. 7, 2007, the disclosure of each of which is incorporated herein by reference.

FIELD OF THE INVENTION

The present invention generally relates to illustrating time. More specifically, the present invention relates to devices, kits, and methods for illustrating elapsed and remaining time during a trip.

BACKGROUND OF THE INVENTION

During long trips, children often become restless. Moreover, young children often have difficulty appreciating the concept of elapsed time. As a result, when a child asks the familiar questions "Are we there yet?," or "How much longer?", a response of an actual distance or number of minutes remaining for the trip may not be understood.

Attempts have been made to guide children in learning to tell time. However, these attempts have been primarily directed to improving a child's ability to read the face of a clock or to understand the various quantities of time, such as minutes and hours. A mastery of these skills, nonetheless, does not provide a child with the ability to estimate and appreciate, for example, how long the passage of an hour actually is. This problem becomes particularly apparent in the context of long periods of travel, during which many restless children feel compelled to ask about the trip's progress every several minutes.

BRIEF SUMMARY OF THE INVENTION

As one aspect of the present invention, devices are provided for illustrating travel time. The devices include a display board or a display screen, a starting point indicator, a destination indicator, a travel path, and a progress indicator. The starting point indicator represents a starting point and is adapted for display on the display board or display screen. The destination indicator represents a destination point and is adapted for display on the display board or display screen. The travel path represents a path of travel between the starting point and the destination point. The progress indicator is adapted to indicate a point between the starting point indicator and the destination indicator and is adapted for movement along the travel path. In an electronic device, the progress indicator is adapted to represent the location of the electronic device on the path of travel.

As another aspect of the present invention, kits are provided for illustrating travel time. The kits comprise a display board, a location indicator set, and a progress indicator. The location indicator set includes a plurality of location indicators, and at least one of these location indicators is adapted to connect to the display board. The progress indicator is adapted to indicate a point between at least two location indicators. The progress indicator is also adapted to connect to the display board. Moreover, the progress indicator is adapted to be moved along a path between at least two location indicators in order to illustrate travel time.

As yet another aspect of the present invention, methods are provided for illustrating travel time. The methods include the steps of displaying a starting point indicator on a display board, displaying a destination indicator on the display board, and displaying a progress indicator on the display board. The progress indicator is adapted to indicate a point between the starting point indicator and the destination indicator. The methods can include moving the progress indicator to illustrate elapsed and/or remaining time. The methods can also include the step of displaying position data.

As a further aspect of the present invention, electronic devices are provided for illustrating travel time. Such devices can comprise a display screen, a starting point indicator adapted for display on the display screen, and a destination indicator adapted for display on the display screen. The devices can also comprise a travel path adapted for display on the display screen, wherein the travel path is adapted to represent a path of travel between the starting point indicator and the destination indicator. The devices can also comprise a progress indicator adapted for display on the display screen and adapted to represent a location of the electronic device on the travel path. In some embodiments, the devices also comprise a positioning device adapted to communicate with the display screen, and the positioning device may be adapted to utilize global positioning system technology.

Figure 1:
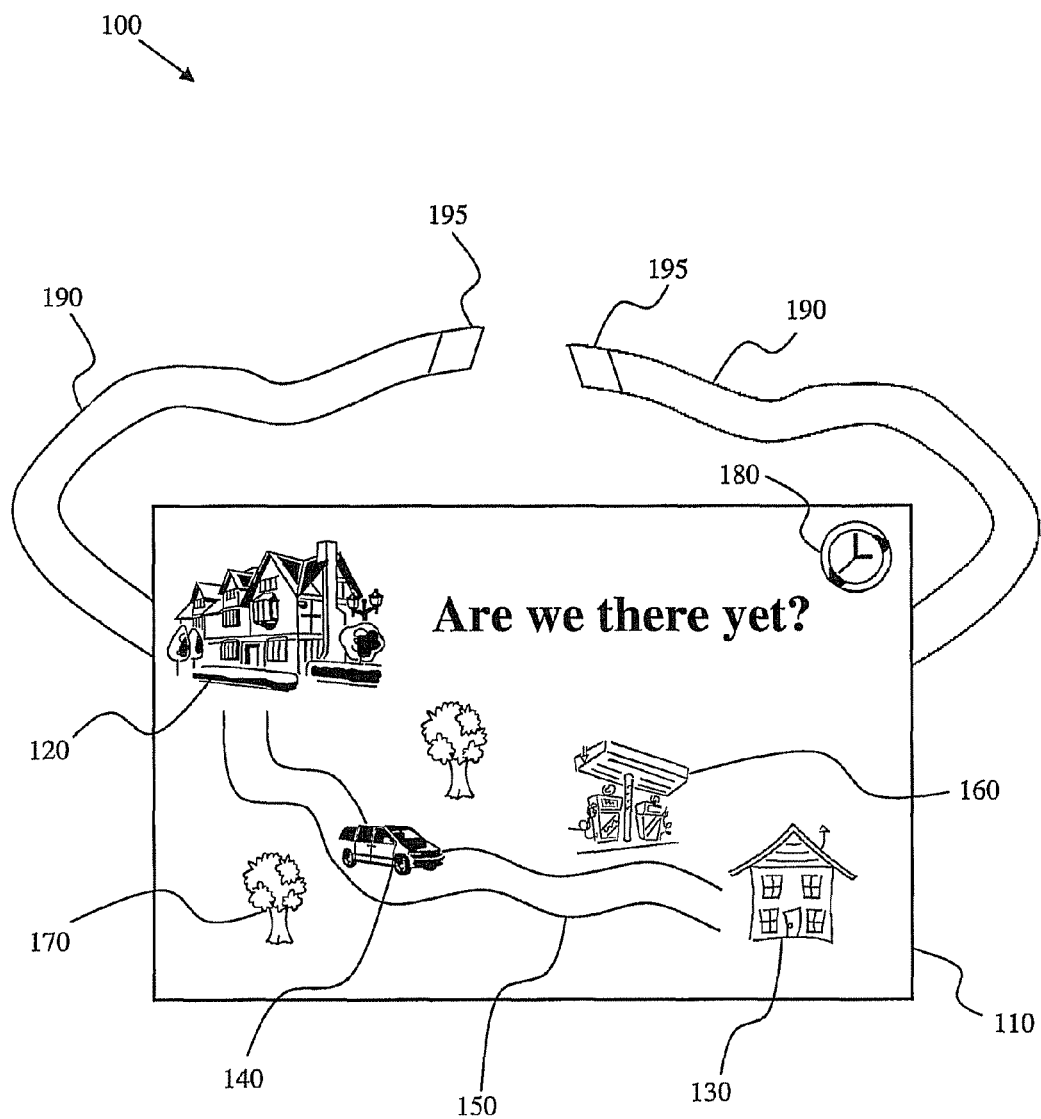
FIG. 1 illustrates a device for illustrating travel time in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

The present inventors have recognized a need for devices, kits, and methods for illustrating travel time during a trip in a way that is comprehensible to children and encourages them to develop their own abilities to understand and appreciate varying lengths of time.

FIG. 1 illustrates a device 100 for illustrating travel time in accordance with an embodiment of the present invention. The device 100 includes a display board 110, a starting point indicator 120, a destination indicator 130, a progress indicator 140, an attachment component 190, and attachment ends

195. In some embodiments, the device 100 further includes a travel path 150, an intermediate indicator 160, additional graphics 170, and a timing device 180. The display board can include one or more captions, taglines, questions, monikers, or other text.

In some embodiments, the starting point indicator 120, destination indicator 130, and progress indicator 140 are adapted for display on the display board 110. For example, the display board 110 may comprise a magnetic material. In such embodiments, one or more of the indicators may also include magnetic material in order to provide a firm but removable connection to the display board 110. Because certain embodiments contemplate use of the device 100 while traveling, a strong connection between an indicator and the display board 110 may be desirable when traveling with the device 100. In other embodiments, the display board 110 may comprise a variety of different materials that also allow for a firm connection between the display board 110 and one or more indicators. For example, a portion or all of the display board 110 may comprise a material that is plastic, rubber, hook-and-loop fastener material (such as Velcro), adhesive, and/or capable of being written upon by a marker. Preferably, one or more of the indicators 120, 130, 140, and 160 are separate from but adapted to connect to the display board 110.

In other embodiments, one or more of the indicators 120, 130, 140, and 160 may be printed on or a part of the display board 110. In some embodiments, one or more indicators 120, 130, 140, and 160 are adapted for permanent connection to the display board 110. For example, one or more of the indicators 120, 130, 140, and 160 may be a sticker adapted to remain permanently on the display board 110.

In some embodiments, the travel path 150, the additional graphics 170, the timing device 180, the attachment component 190, the attachment ends 195, and the indicators 120, 130, 140, and 160 may be adapted to be removably attached to the display board 110.

In some embodiments, the indicators 120, 130, 140, and 160 may represent a starting point for travel, a travel destination, the progress of a trip, an intermediate point during a trip, a landmark, or other item to be displayed on the display board 110. The indicators 120, 130, 140, and 160 (and any indicators used in the present devices, kits and methods) can include, but are not limited to, graphics, words, colors, dots, logos, trademarks, symbols, other visual indicators, or combinations of the foregoing. In embodiments where one or more of the indicators 120, 130, 140, and 160 includes one or more graphics, each graphic may be a drawing, cartoon, photograph, picture, image, symbol, logo, or a combination of the foregoing. The graphic may also include words or phrases.

The indicators 120, 130, 140, and 160, and any indicators used in the present devices, kits and methods, may include a brand name, a trademark, or another indication of one or more sources of goods or services. For example, an indicator may include a MCDONALD'S, DUNKIN' DONUTS, or DISNEY name or logo to indicate on the display board 110 the location of a MCDONALD'S restaurant, a DUNKIN' DONUTS establishment, or a DISNEY theme park. Other examples of words or subject matter that may be included in any of the indicators include, but are not limited to: Mom's, Dad's, Grandma's, Grandpa's, Grandparents', Aunt's, Uncle's, Cousin's, Brother's, Sister's, Neighbor's, Friend's, BURGER KING, WENDY'S, TACO BELL, WHITE CASTLE, PIZZA HUT, CHUCK' E. CHEESE, Ice Cream, Movies, Baseball game, Basketball game, Football game, Soccer game, Tennis game, Skiing, Skating, Playground, School, College, University, Airport, Church, Doctor, Dentist, Grocery Store, K-MART, WAL-MART, TARGET, SAM'S CLUB, COSTCO, Restaurant, Camping, Boating, Fishing, Camp, Amusement Park, Mall, Summer House, Beach House, Water Park, National Park, Park, Florida, California, Arizona, other states, other countries, Europe, Asia, and Australia. Words, graphics or other visual indications can be in any desired font, size, shape, capitalization, or color. All possessive nouns may be singular or plural.

In still another embodiment, one or more of the indicators 120, 130, 140, and 160 may be adapted for modification by a user of the device 100. For example, the starting point indicator 120 may be a blank square upon which a user of the device 100 may draw a personalized starting point, such as his or her house.

The device 100 may be used during travel in a variety of ways. For example, the device 100 may be used to illustrate travel time during a car trip. In this example, the attachment component 190 of the display board 110 may connect the display board 110 to an overhead visor in the car using hook-and-loop fasteners located at the attachment ends 195. In other embodiments, the display board 110 may be adapted to connect to a window, a seat, a headrest, a wall, a dashboard, or some other substantially solid surface. In some embodiments, the attachment component 190 may include an elastic or adhesive material, a suction cup, a hook, or a hanger for providing the connection. Alternatively, the display board 110 may include no attachment component 190 and instead be used on a user's lap, for example. In some embodiments, the device 100 may be used during trips taken by car, plane, train, or other modes of transportation.

In operation, a user of the device 100 may connect the starting point indicator 120 and the destination indicator 130 to the display board 110 in order to illustrate the starting point and destination point, respectively, for the trip. For example, to illustrate travel time during a driving trip to a grandparent's house, as illustrated in FIG. 1, a starting point indicator 120 representing the user's house may be connected to one end of the display board 110. Next, a destination indicator 130 representing the grandparent's house may be connected to another end of the display board 110. The starting point indicator 120 and the destination indicator 130 may connect to the display board 110 using materials such as adhesives, magnets, hook-and-loop fasteners, pegs, hooks, or clips, for example. The starting point indicator 120 and the destination indicator 130 may be made from and/or use the same or different materials. In an alternative embodiment, a picture or symbol representing the starting point or destination point may be drawn upon the display board 110.

In some embodiments, the display board 110 illustrates the travel path 150 that will be taken during the trip. The travel path 150 may be symbolic, may not be drawn to scale, and/or may not accurately represent the actual path to be taken during the trip. However, in other embodiments, the travel path 150 may provide an accurate representation of the actual path to be traveled. The travel path 150 may be removable and may comprise a single piece or multiple segments that may be straight, curved, and/or bendable. In some embodiments, additional graphics 170 may be located along the travel path 150 as well. For example, an additional graphic 170 of a cloud, lake, person, or other entity may be displayed on the display board 110.

At the beginning of the trip, the progress indicator 140 is preferably connected to the display board 110 substantially near the starting point indicator 120. In some embodiments, the materials comprising the progress indicator 140, as well as those used to connect the progress indicator 140 to the display board 110, may include the materials described above with regard to the starting point indicator 120 and the destination indicator 130. The progress indicator may comprise the same materials or different materials as the starting point indicator and destination point indicator. As the trip progresses and the destination point becomes closer, the progress indicator 140 may be moved along the travel path 150 by an appropriate amount to illustrate how much time has passed during the trip and how much travel time remains. For instance, with regard to the example shown in FIG. 1, assume that the drive from the user's house to his or her grandparent's house typically takes four hours. If halfway through the four-hour trip someone asks about the progress of the trip, the progress indicator 140 may be placed along the travel path 150 halfway between the starting point indicator 120 and the destination indicator 130. Similarly, if the trip's progress is requested after only one hour into the trip, then the progress indicator 140 may be placed one fourth of the way from the starting point indicator 120 to the destination indicator 130 along the travel path 150.

Through use of the device 100, the person requesting the information, for example a child asking "Are we there yet?," may begin to associate the time spent traveling with the actual amount of time elapsed. In addition to teaching the ability to gauge time, the device 100 provides understandable information for children who have not yet mastered the ability to tell time. For example, if a parent tells a small child that they will be driving for one more hour until the destination is reached, the child may be unable to understand and appreciate that length of time. Instead, using the device 100, the parent may use the starting point indicator 120, destination indicator 130, and progress indicator 140 to illustrate how much travel time remains. In the example shown in FIG. 1, the minivan graphic functioning as the progress indicator 140 may be moved three-fourths of the way from the starting point indicator 120 to the destination indicator 130 to illustrate that, in the four-hour trip, only one hour of travel remains.

In some embodiments, an intermediate indicator 160 may be located between the starting point indicator 120 and the destination indicator 130. For example, a landmark such as a highway rest area or gas station may be located at some point between the trip's starting point and destination, and this landmark may be represented by the intermediate indicator 160. During a long driving trip, a restless child may become discouraged if the destination will not be reached for another several hours. However, if another landmark will be reached before that time, then the apparent length of the trip may be less discouraging. For example, as shown in FIG. 1, if the child observes that the car will soon be approaching a gas station, represented by the intermediate indicator 160, the long trip to the ultimate destination may seem somewhat shorter. An intermediate indicator 160 may be anywhere between the starting point indicator 120 and the destination indicator 130 and can divide the path into equal or unequal intervals; that is, intermediate indicator 160 can be (but does not have to be) halfway between the starting point indicator 120 and the destination indicator 130. In alternative embodiments, more than one intermediate indicator 160 may be connected to the display board 110 and they may be located at equal or unequal intervals along a travel path. Additionally, in some embodiments, the materials comprising the intermediate indicator 160, as well as those used to connect the intermediate indicator 160 to the display board 110, may include the materials described above with regard to the starting point indicator 120, the destination indicator 130, and the progress indicator 140. The intermediate indicators 160 may be the same or different material than the other indicators.

In some embodiments of a kit for illustrating travel time, the various indicators 120, 130, 140, and 160 adapted for use with the display board 110 may be provided in one or more indicator sets. For example, a starting point indicator set may be provided that includes numerous starting point indicators 120 that may be used with the display board 110, such as a house, a hotel, or an apartment building. Similarly, a destination indicator set may be provided that includes numerous destination indicators 130 that may be used with the display board 110, such as a house, a beach, an amusement park, a restaurant, or a movie theater. Moreover, a progress indicator set may be provided that includes numerous progress indicators 140 that may be used with the display board 110, such as a car, a plane, or a train. Finally, an intermediate indicator set may be provided that includes numerous intermediate indicators 160 that may be used with the display board 110, such as a gas station, a rest area, or a park. In other embodiments, one or more intermediate indicators 160 may include brand names, logos, or other licensed images. In some embodiments, some or all of the display board 110 and the various indicators 120, 130, 140, and 160 may be provided as a kit of separate components that are ultimately connected by a user of the kit.

Additionally, some embodiments of the present invention contemplate using two or more devices 100 in conjunction with one another. For example, if the trip being illustrated is particularly lengthy, two devices 100 may be placed next to one another, such that the first device 100 illustrates a first portion of the trip and the second device 100 illustrates a second portion of the trip.

In other embodiments, the display board 110 is adapted to display multiple starting point indicators 120, destination indicators 130, or progress indicators 140. For example, if a family reunion will be held in Illinois, and one set of family members will be traveling to Illinois from New York while another set is traveling from California, it may be beneficial to indicate the travel progress of both sets of family members on the display board 110. Using multiple starting point indicators 120 and progress indicators 140, the progress of both groups may be illustrated.

In other embodiments, the display board 110 may be adapted to include a clock 180. The clock 180 may display the time of day or may provide stopwatch or countdown capabilities. In embodiments where the clock 180 provides the time of day, children who are learning to tell time or who can already tell time will benefit from the ability to associate their perceptions of time based on their travel progress with actual periods of time. In embodiments in which the clock 180 functions as a stopwatch or countdown timer, the device 100 may provide specific information about the time that has elapsed during the trip or the amount of time remaining before the trip is completed. In other embodiments, the display board 110 may be adapted to include a mileage indicator. The mileage indicator can indicate distance in miles, yards, feet, kilometers, meters, or any other unit distance. The mileage indicator may display the total distance of the trip, and/or the distance remaining in the trip, and/or the distance already traveled in the trip. The distance shown in the mileage indicator can be precisely accurate or approximated, and it may be set by a user or calculated or determined by an automated device, computer or microprocessor.

Figure 2:
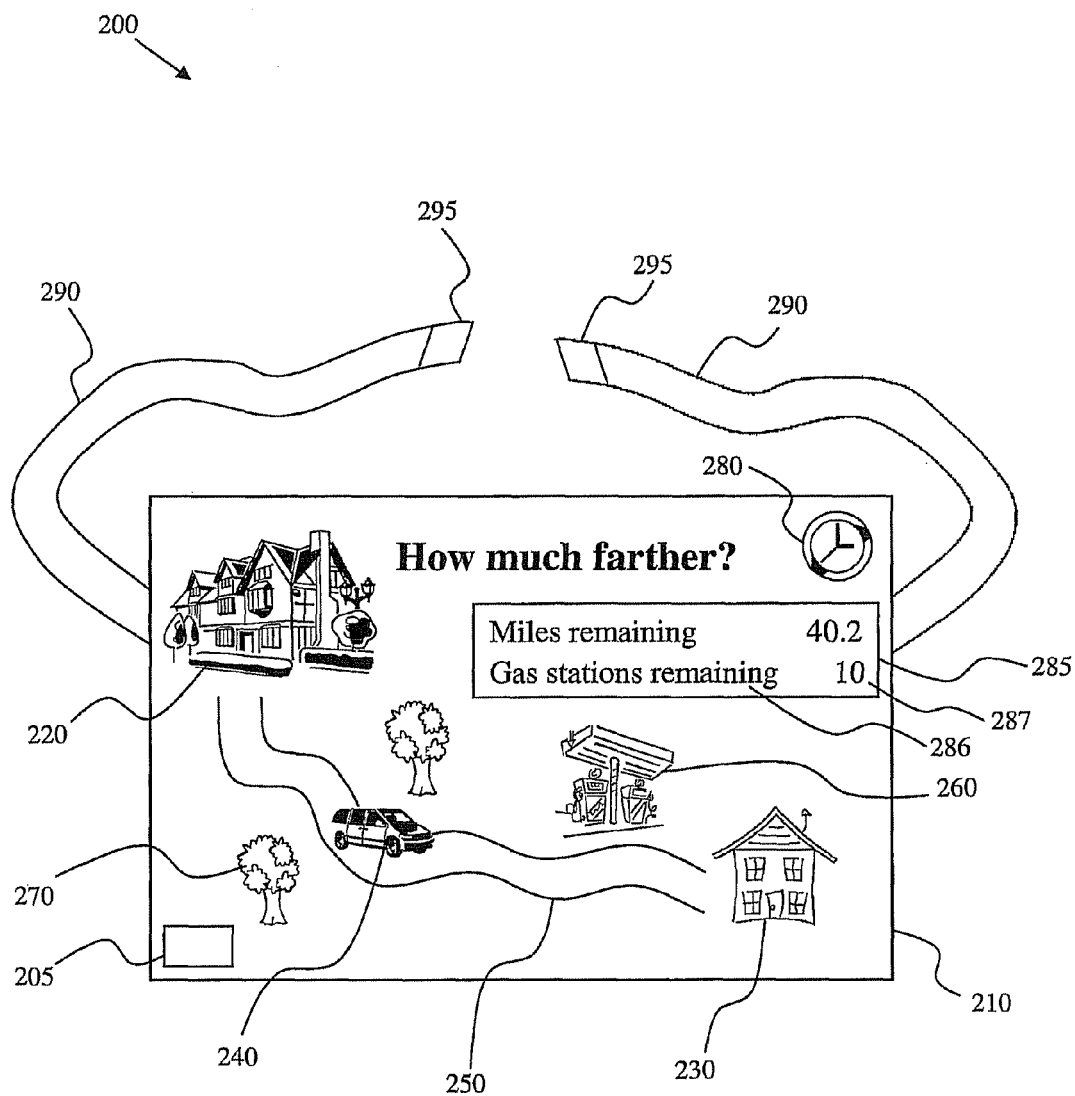
FIG. 2 illustrates a device for illustrating travel time on a display screen in accordance with an embodiment of the present invention.

In some embodiments, the device for illustrating travel time is an electronic device 200 having a display screen 210. The indicators described above are adapted for display on the display screen 210. For example, each indicator may be an electronically-generated indicator shown on the display screen 210. In other embodiments, each indicator may be a physical indicator that is connected to the display screen 210. In an embodiment, the device 200 includes a display area 285 that includes one or more display fields 286. For example, as shown in FIG. 2, the display fields 286 may display text such as "Miles remaining" and/or "Gas stations remaining." In this embodiment, the display area 285 further includes one or more data displays 287. For example, as shown in FIG. 2, the data displays 287 may display the number of miles remaining in the trip and/or the number of gas stations that will be passed during the remainder of the trip. This data may be provided by an electronic positioning device 205 in communication with the data displays 287. For example, the device 200 may include an integrated GPS system adapted to calculate data for display on one or more data displays 287. Alternatively, the positioning device 205 may use another form of satellite positioning, wi-fi technology, inertial measuring, mobile tracking, and/or other available positioning technologies. In some embodiments, the positioning device 205 is integrated within the device 200, as shown in FIG. 2. In other embodiments, the positioning device 205 is separable from but is adapted to communicate with the device 200.

The positioning device 205 utilized by the device 200 may be adapted to provide a variety of data. For example, as shown in FIG. 2, the positioning device 205 may provide the number of miles remaining in the trip. This data may be obtained, for example, by finding the positional difference between the position of the destination, which may be represented by the destination indicator 230, and the current position of the device 200, which may be represented by the progress indicator 240. In certain embodiments, the positioning device 205 may account for the desired route to be taken during the trip, rather than the simple distance between the points. In other embodiments, the positioning device 205 may be adapted to display data such as the number of gas stations, or another type of landmark, between the current position of the device 200 and the destination point. To provide this functionality, the positioning device 205 is preferably programmed with or adapted to identify the locations of various landmarks. In certain embodiments, the device 200 may include one or more game-type features that utilize the position data provided by the positioning device 205. For example, the device 200 may include an interactive game that prompts a user of the device 200 to guess the mileage between two locations on a map. In another embodiment, the device 200 may be adapted to display on the display screen 210 trivia questions or facts relating to one or more locations or landmarks.

Figure 3:
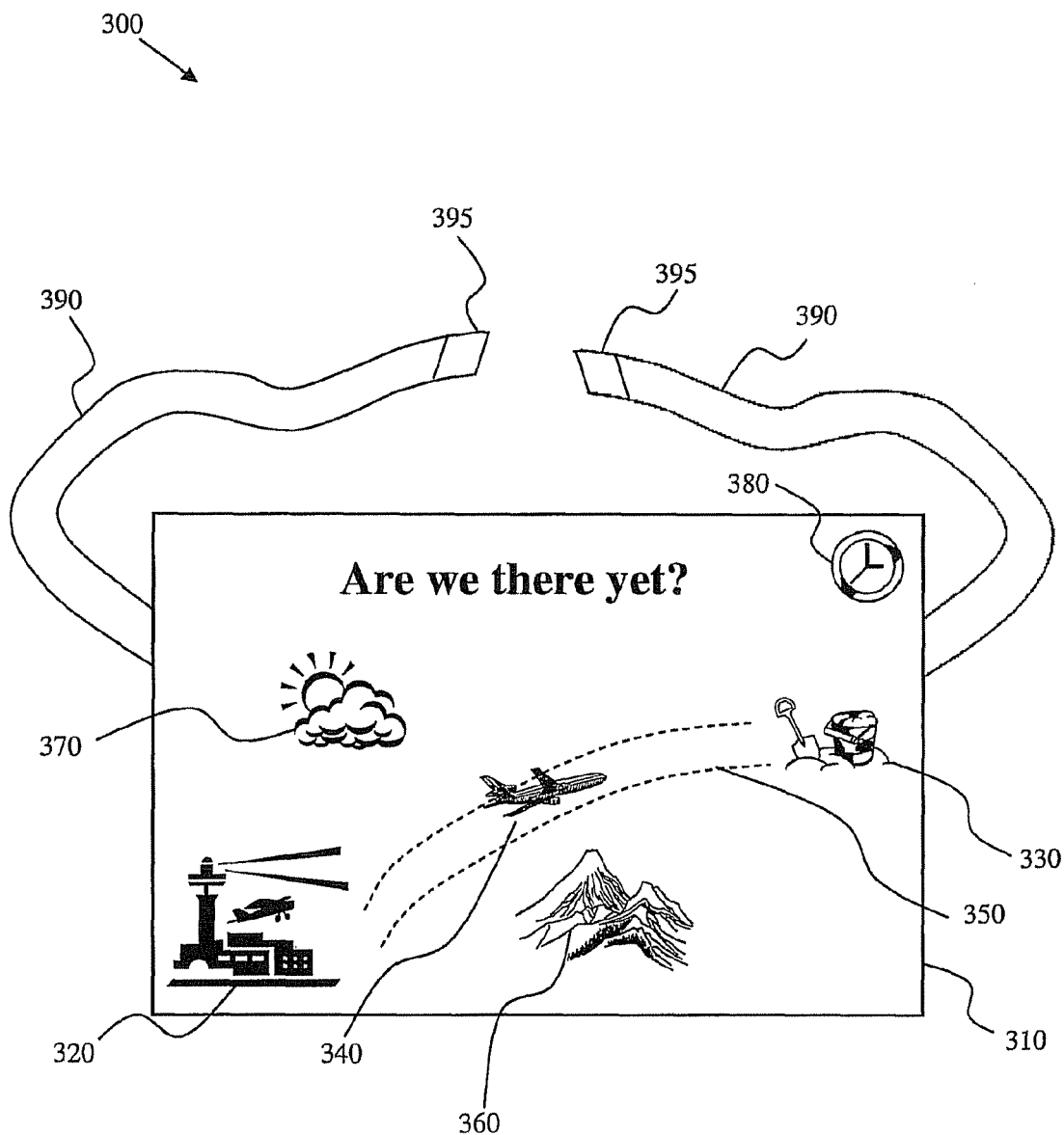
FIG. 3 illustrates a device for illustrating travel time during a plane trip in accordance with an embodiment of the present invention.
Figure 4:
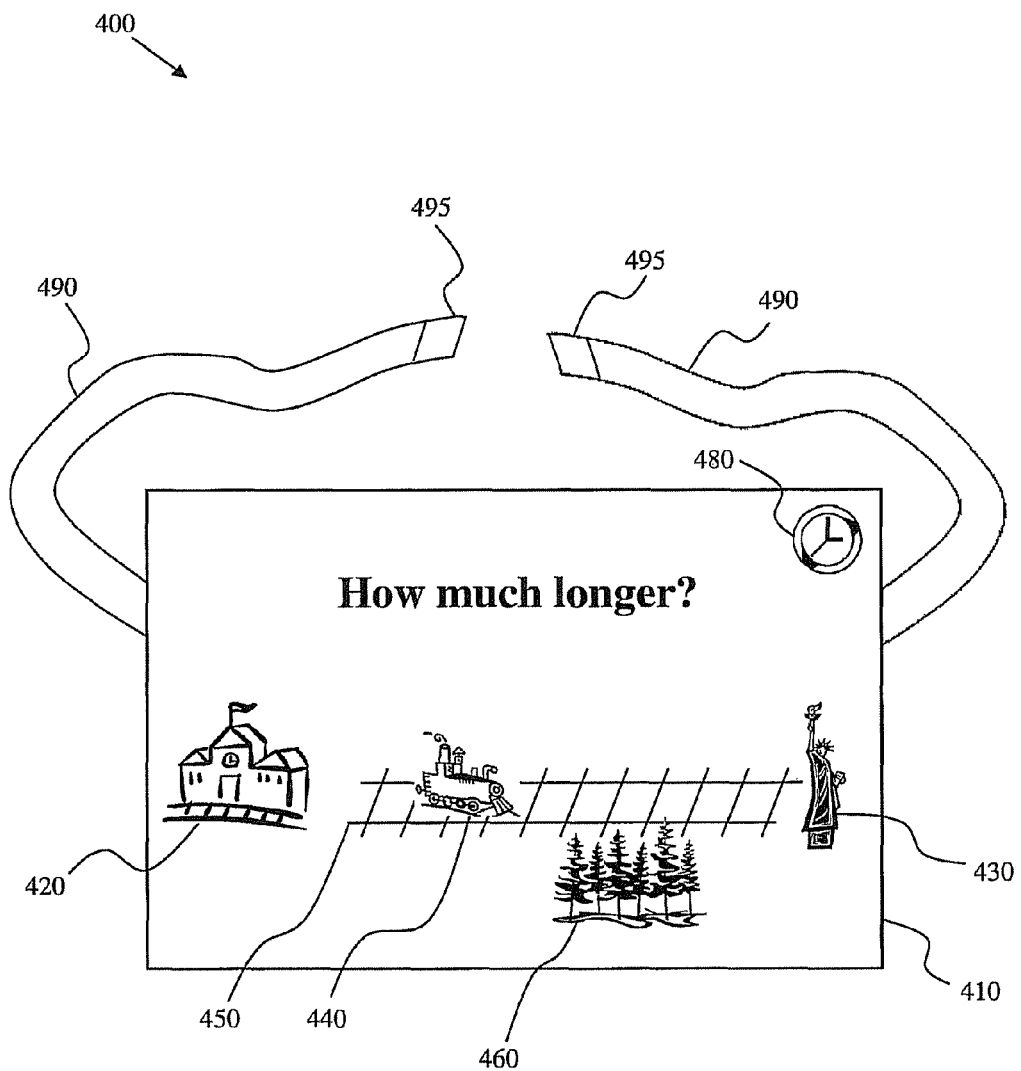
FIG. 4 illustrates a device for illustrating travel time during a trip on a train in accordance with an embodiment of the present invention.
Figure 5:
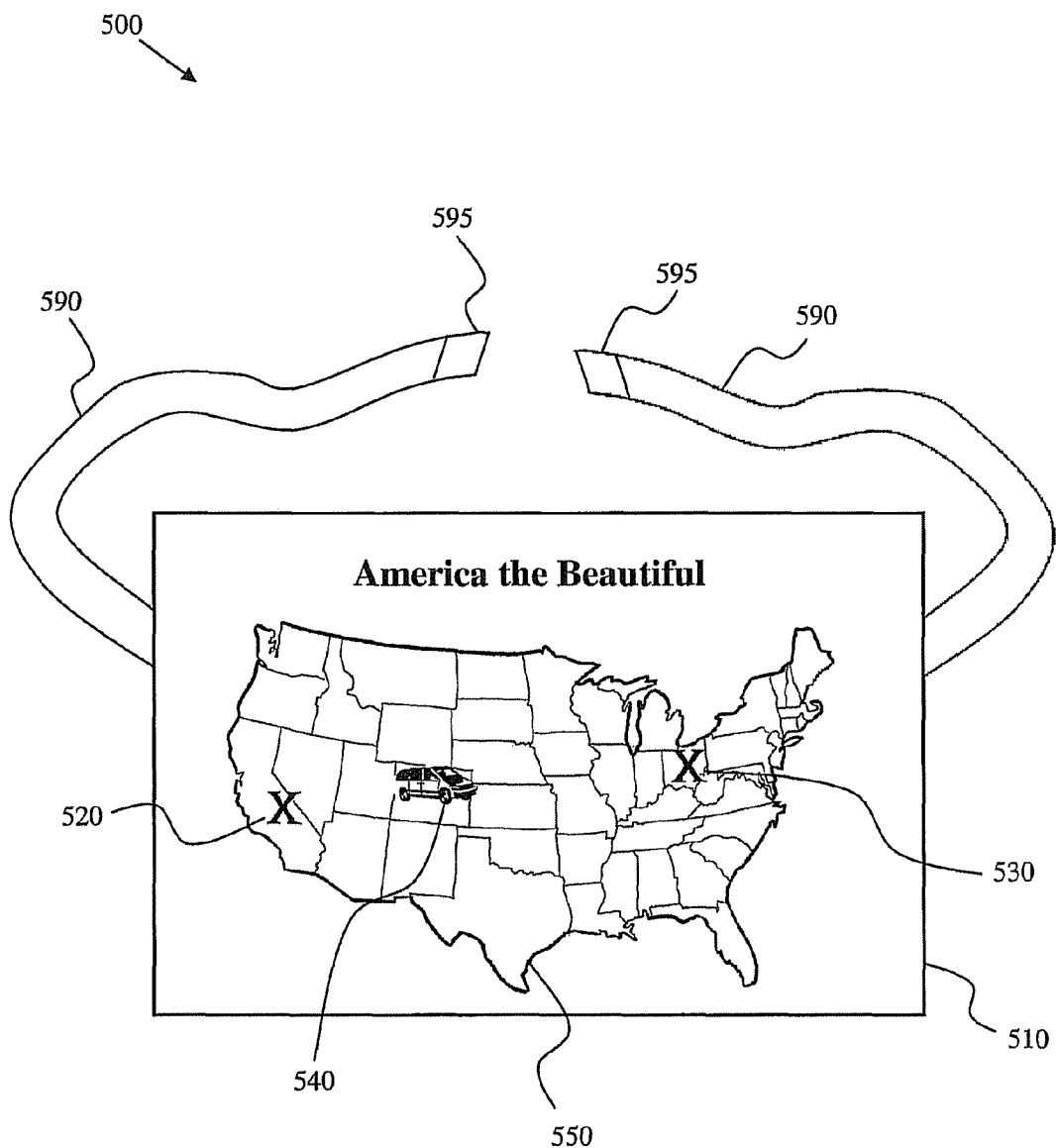
FIG. 5 illustrates a device for illustrating travel time during a cross-country driving trip in accordance with an embodiment of the present invention.

FIGS. 3, 4 and 5 illustrate other embodiments of a device in accordance with the present invention. However, the various alternatives, configurations, and functionalities described above with regard to FIGS. 1 and 2 can also be applied to the devices shown in FIGS. 3-5 as well.

FIG. 3 illustrates a device 300 for illustrating travel time during a plane trip. The device 300 includes a display board 310, a starting point indicator 320, a destination indicator 330, a progress indicator 340, an attachment component 390, and attachment ends 395. In some embodiments, the device 300 further includes a travel path 350, an intermediate indicator 360, additional graphics 370, and a clock 380. As described above with regard to FIG. 1, the progress indicator 340 may be moved between the starting point indicator 320 and the destination indicator 330 along the travel path 350 in order to illustrate the progress of a trip. In the example shown in FIG. 3, the device 300 is adapted for use during a plane trip, the ultimate destination of which is a beach. Accordingly, the starting point indicator 320 is an airport graphic, the destination indicator 330 is a beach graphic, and the progress indicator 340 is an airplane graphic.

FIG. 4 illustrates a device 400 for illustrating travel time during a trip on a train. The device 400 includes a display board 410, a starting point indicator 420, a destination indicator 430, a progress indicator 440, an attachment component 390, and attachment ends 495. In some embodiments, the device 400 further includes a travel path 450, an intermediate indicator 460, and a clock 480. In the example shown in FIG. 4, the device 400 is adapted for use during a trip to New York on a train. Accordingly, the starting point indicator 420 is a train depot graphic, the destination indicator 430 is a depiction of the Statue of Liberty, and the progress indicator 440 is a locomotive graphic. Of course any of those indicators can include different or additional words, graphics or other subject matter.

FIG. 5 illustrates a device 500 for illustrating travel time during a cross-country drive. The device 500 includes a display board 510, a starting point indicator 520, a destination indicator 530, a progress indicator 540, a map 550, an attachment component 390, and attachment ends 395. In this example, the device 500 shown in FIG. 5 illustrates a cross-country driving trip from California to Ohio. Although the map 550 shown in FIG. 5 is a map of the United States, other embodiments of the present invention contemplate other types of maps, such as state, world, or topographic maps, for example. Of course any of those indicators can include different or additional words, graphics or other subject matter.

Figure 6:
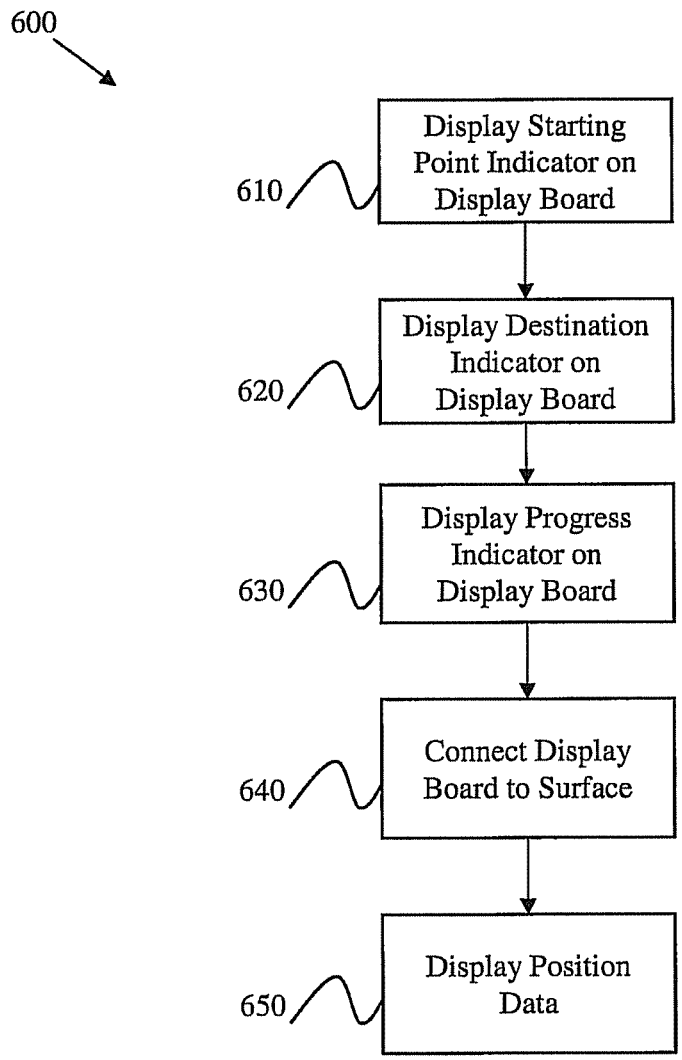
FIG. 6 illustrates a flow diagram for a method for illustrating travel time in accordance with an embodiment of the present invention.

FIG. 6 illustrates a flow diagram for a method 600 for illustrating travel time. The method 600 includes the following steps, which will be described below in more detail. At step 610, a starting point indicator is displayed on a display board. At step 620, a destination indicator is displayed on the display board. At step 630, a progress indicator is displayed on the display board. At step 640, the display board is connected to a surface. At step 650, position data is displayed.

At step 610, a starting point indicator is displayed on a display board. In some embodiments, the starting point indicator represents a travel starting point. For example, the starting point indicator may be the same as or similar to the starting point indicator 120 of FIG. 1. In some embodiments, the starting point indicator is adapted to connect to the display board. This connection may be established in a variety of ways, as described above with regard to FIG. 1. Alternatively, the starting point indicator may be printed on or a part of the display board. Moreover, the display board may be the same as or similar to the display board 110 of FIG. 1. As described above with regard to FIG. 1, the display board may comprise a variety of different materials.

At step 620, a destination indicator is displayed on the display board. In some embodiments, the destination indicator represents a travel destination point. For example, the destination indicator may be the same as or similar to the destination indicator 130 of FIG. 1. In some embodiments, the destination indicator is adapted to connect to the display board. This connection may be established in a variety of ways, as described above with regard to FIG. 1. Alternatively, the destination indicator may be printed on or a part of the display board.

At step 630, a progress indicator is displayed on the display board. In some embodiments, the progress indicator is adapted to indicate a point between the starting point indicator and the destination indicator. For example, the progress indicator may be the same as or similar to the progress indicator 140 of FIG. 1. In some embodiments, the progress indicator is adapted to connect to the display board and may be selectively moved along the surface of the display board. This connection may be established in a variety of ways, as described above with regard to FIG. 1. Alternatively, the progress indicator may be printed on or a part of the display board.

At step 640, the display board is connected to a surface. In some embodiments, the display board may be removably or permanently connected to one or more surfaces. For example, the display board may be connected to a window, a seat, a visor, a dashboard, a headrest, a wall, and/or a tray. In some embodiments, the display board 110 may connect to a surface using one or more of an elastic material, an adhesive, a suction cup, a hook, a hanger, and a hook-and-loop fastener.

At step 650, position data is displayed. In certain embodiments, the display board 110 functions as a display screen, which may be similar to the display screen 210 of FIG. 2. Position data may be displayed on the display screen 210 in order to communicate information about the relative positions of the locations represented by the progress indicator and the destination indicator. In an embodiment, this position data is provided by a positioning device that is adapted to communicate with the display screen. For example, the positioning device may utilize GPS technology or another positioning technology, as described above with regard to FIG. 2.

The alternative embodiments, configurations, and functionalities described above with regard to FIGS. 1-5 also apply to the steps of the method 600 for illustrating travel time. Moreover, some embodiments of the present invention may omit one or more of the steps comprising the method 600 or may perform the steps in a different order than the order listed. For example, some steps may not be performed in certain embodiments of the present invention. As a further example, certain steps may be performed in a different temporal order, including simultaneously, than listed above.

In the present specification, use of the singular includes the plural except where specifically indicated. The use of the terms "a" and "an" and "the" and similar referents in the context of describing the invention (especially in the context of the claims) are to be construed to cover both the singular and the plural.

In the present specification, any of the functions recited herein may be performed by one or more means for performing such functions. With respect to the methods described in the specification, it is intended that the specification also provides a description of devices and products performing those methods. With respect to the devices, kits, and combinations described in the specification, it is intended that the specification also provides a description of the components, parts, portions, of such c devices, kits, and combinations.

Although the dependent claims have single dependencies in accordance with U.S. patent practice, each of the features in any of the dependent claims can be combined with each of the features of other dependent claims or the main claim.

The invention claimed is:

1. A device for illustrating travel time during a trip, the device comprising:
 a display screen;
 a starting point indicator adapted for display on said display screen;
 a destination indicator adapted for display on said display screen;
 a travel path adapted for display on said display screen, wherein said travel path is adapted to represent a path of travel between said starting point indicator and said destination indicator; and
 a progress indicator adapted to indicate a point between said starting point indicator and said destination indicator, wherein said progress indicator is adapted for movement along said travel path, wherein the starting point indicator is displayed on said display screen during the trip, and the progress indicator illustrates elapsed time or remaining time or both on the trip.

2. The device of claim 1, wherein at least a portion of said display screen comprises a material adapted to be marked upon by a marker.

3. The device of claim 1, further comprising:
 an intermediate indicator on said display screen between said starting point indicator and said destination indicator, wherein said intermediate indicator represents a location between said starting point and said destination point.

4. The device of claim 1, wherein said display screen comprises a map.

5. The device of claim 1, further comprising a timing device.

6. The device of claim 1, wherein one or more of the starting point indicator, the destination indicator, and the progress indicator includes one or more words selected from the group consisting of MCDONALD'S, DUNKIN' DONUTS, DISNEY, BURGER KING, WENDY'S, TACO BELL, WHITE CASTLE, PIZZA HUT, CHUCK E. CHEESE, K-MART, WAL-MART, TARGET, SAM'S CLUB, and COSTCO.

7. The device of claim 1, wherein one or more of the starting point indicator, the destination indicator, and the progress indicator includes one or more words selected from the group consisting of Mom's, Dad's, Grandma's, Grandpa's, Grandparents', Aunt's, Uncle's, Cousin's, Brother's, Sister's, Neighbor's, Friend's, Ice Cream, Movies, Baseball game, Basketball game, Football game, Soccer game, Tennis game, Skiing, Skating, Playground, School, College, University, Airport, Church, Doctor, Dentist, Grocery Store, Restaurant, Camping, Boating, Fishing, Camp, Amusement Park, Mall, Summer House, Beach House, Water Park, National Park, Park, Florida, California, Arizona, other states, other countries, Europe, Asia, and Australia.

8. The device of claim 1, wherein the starting point indicator is personalized.

9. The device of claim 1, further comprising a display of miles elapsed in a trip or remaining in a trip or both.

10. The device of claim 1, further comprising an electronic positioning system.

11. The device of claim 10, wherein the electronic positioning system is an integrated global positioning system adapted to calculate data for displaying on the display screen.

12. The device of claim 11, wherein the electronic positioning system is selected from satellite positioning, wi-fi technology, inertial measuring, and mobile tracking.

13. The device of claim 1, further comprising an interactive game that prompts the user to guess mileage between two of the indicators on the display screen.

14. The device of claim 1, wherein the device is adapted to display on the display screen trivia questions or facts relating to one or more locations or landmarks.

15. The device of claim 1, wherein one or more of the starting point indicator, the destination indicator, and the progress indicator includes one or more graphics selected from a drawing, cartoon, photograph, picture, image, symbol, logo, or a combination of the foregoing.

16. A method for illustrating travel time, the method comprising:
 displaying a starting point indicator on a display screen during a trip;
 displaying a destination indicator on said display screen;
 displaying a progress indicator on said display screen, wherein said progress indicator is adapted to indicate a point between said starting point indicator and said destination indicator, and illustrating elapsed time or remaining time or both to one or more children during the trip.

17. The method of claim 16, further comprising:
connecting said display screen to at least one of a window, a seat, a visor, a dashboard, a headrest, a wall, and a tray.

18. The method of claim 16, wherein one or more of the starting point indicator, the destination indicator, and the progress indicator includes one or more graphics selected from a drawing, cartoon, photograph, picture, image, symbol, logo, or a combination of the foregoing.

19. The method of claim 16, wherein the method further comprises illustrating travel time during a trip to one or more children.

20. The method of claim 16, wherein the method further comprises showing the progress indicator to one or more children while traveling.

* * * * *